Patented Feb. 28, 1928.

1,661,043

UNITED STATES PATENT OFFICE.

WILLIAM KOEHLER, OF CLEVELAND, OHIO.

PROCESS OF PRODUCING MAGNESIUM OXIDE OF HIGH GRADE.

No Drawing. Application filed October 15, 1927. Serial No. 226,513.

My invention provides a process for obtaining magnesium oxide, and mixed oxides, from dolomite and other magnesium bearing and calcium bearing materials, and the recovery of by-products of the reactions involved.

My invention also provides a ready means for mixing certain metallic oxides, such as iron oxide, and aluminum oxide, with the predominating product of the process, magnesium oxide, as will be explained, and I therefore do not limit my invention to any specific use.

This application is a continuation in part of my application filed December 14th, 1922, Serial Number 607,011.

In practising my invention, I preferably employ crude dolomite, such for instance as occurs in Ohio, of approximately 44% magnesium carbonate, 55% of calcium carbonate, and the balance of about 1% being composed of silica, iron, alumina, and possibly traces of other elements. I may, however, employ readily obtainable low grades, so-called magnesite instead of dolomite, as in commercial terminology, the line of demarcation between dolomite and magnesite does not appear to be clearly established. As one of the objects of my invention is the provision of a process by which large quantities of the product of my process may be produced from inexpensive materials at low cost, I prefer to utilize low priced and readily obtainable dolomite, or magnesite.

With this crude dolomite or magnesite I mix a reagent consisting principally of magnesium chloride, the latter in an amount, preferably slightly in excess of the equivalent of the lime content of the magnesite or dolomite which is used, the commercial magnesium chloride frequently contains as impurities chlorides or other halogen salts of other elements; if it be desired that the resultant product contain iron or aluminum or other metallic oxides, their respective chlorides may be added in place of an equivalent quantity of magnesium chloride or other reacting chloride present to the amount necessary to produce the desired product. The materials which enter into this mixture are then handled in the following order of operations: The crude dolomite or magnesite, or mixture containing magnesium carbonate and calcium carbonate and the magnesium chloride reagent, with mixed chloride if used, are first mixed and then calcined preferably in the presence of a controlled quantity of moisture, for example steam, which aids in effecting the reaction at a reduced temperature, which starts as low as 150° centigrade with some materials. The calcined materials are next washed with water, the calcium chloride being brought into solution and the insolubles, consisting of magnesia and impurities (small amounts of silica, iron oxide and alumina) together with the added oxides resulting from the decomposition of the mixed chlorides (if used) of the original mixture, being separated from the calcium chloride by known methods.

It will be understood that the materials should preferably be comminuted both before and after the calcining operation. Ordinarily the comminuting and mixing are performed in one operation after the materials have been crushed to a size suitable for fine dry or wet grinding.

I have found that when magnesium chloride and other metallic chlorides such as iron, aluminum and the like, are mixed with dolomite or magnesite before calcining, the temperature required for "dead burning" the mixture begins as low as 150° centigrade and may be carried up to from 650° to 750° centigrade, which upper temperature is some 300° less than is required for "dead burning" the dolomite or magnesite when the magnesium chloride is not present.

In just what order the chemical reactions which take place occur in the carrying out of my process, is unknown to me. Whether the calcium and magnesium carbonates are first reduced to oxides and then the magnesium of the magnesium chloride (or the magnesium-iron-aluminum and the like of the mixed chlorides) and the calcium of the calcium oxide change places; or, the magnesium of the magnesium chloride (or the magnesium-iron-aluminum and the like of the mixed chlorides) and the calcium of the calcium carbonate change places before the carbonate is reduced to oxide; or, the transposition of the calcium and magnesium (or the magnesium-iron-aluminum and the like of the mixed chlorides) occurs simultaneously with the release of the carbon dioxide from the carbonate; or, the magnesium chloride in the presence of air at an elevated temperature breaks up into $MgO + Cl_2$, or in the presence of moisture into MgO+HCl and the chlorine or the hydrochloric acid so formed reacts with the lime constituent to form $CaCl_2+CO_2$, I do not know. But, whatever the order of the reactions the result of them is that the calcination of the crude dolomite is effected at a lower temperature than when calcined alone, with some mixtures the reaction begins as low as 150° centigrade, and the product is composed of magnesium oxide (or magnesium-iron-aluminum and the like oxides) and calcium chloride, together with the impurities, silica, iron oxide and alumina contained in the original dolomite or magnesite.

The result of the process is represented by the following equation when magnesium chloride only is used and no accounting of the impurities is made:

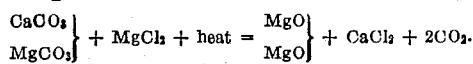

If aluminum chloride be used the reaction will be represented by the following equation, no accounting of the impurities being made:

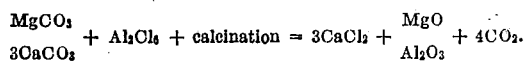

If iron chloride be used the reaction will be represented by the following equation, no accounting of the impurities being made:

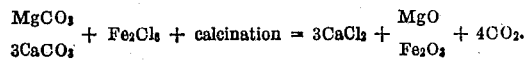

And, if other mixed chlorides be used the reaction will be similar to the foregoing as will be understood.

By my process when using magnesium chloride alone, I am able to and have produced from Ohio dolomite of the above given average analyses a product containing the original silica, iron and alumina content together with the aggregate magnesium oxide in the original dolomite and the magnesium oxide produced by the decomposition of the magnesium chloride, the product having a lime content of about 2½%. It will be seen that from crude, low grade dolomite or magnesite my process produces a high grade magnesium oxide and, further, it will be observed that the lime content has been dropped from 55% to 2½%.

By using mixed chlorides I have also produced products containing predetermined synthetic proportions of magnesia, alumina and iron oxide. I do not however limit my invention to the production of magnesium, iron and aluminum oxides as I may use other chlorides which react in a similar manner.

The advantages of my process will be apparent to those skilled in the art.

I claim:

1. A process of producing a magnesium oxide of high grade, which comprises adding a reagent containing magnesium chloride to a mixture of magnesium carbonate and calcium carbonate, calcining the resulting mixture, and removing water-soluble products from the calcined material.

2. A process of separating magnesium carbonate bearing and calcium carbonate bearing materials, which consists in adding a reagent containing magnesium chloride to a mixture of said calcium bearing and magnesium bearing materials, calcining the resulting mixture and washing to calcined materials.

3. A process of separating magnesium bearing and calcium bearing materials which consists in calcining a mixture of magnesium carbonate, calcium carbonate, and a magnesium chloride reagent, and washing the calcined materials to dissolve out calcium chloride.

4. The process of converting dolomite to a magnesium oxide of high grade, which consists in calcining a mixture of dolomite and a magnesium chloride reagent, washing the calcined materials to dissolve out calcium chloride, and separating the insolubles from the calcium chloride by known methods.

5. A process of producing a magnesium oxide product, which comprises adding a reagent containing magnesium chloride to a mixture of magnesium and calcium carbonate, calcining the resultant mixture at a temperature from 150° centigrate upward, and removing water-soluble products from the calcined material.

6. A process of treating magnesium-calcium carbonates, which comprises adding a reagent containing a chloride of the non-alkaline metals to said carbonates, calcining the resultant mixture at a temperature from 150° centigrade upward, and removing water-soluble products from the calcined material.

7. A process of separating magnesium bearing and calcium bearing materials, which comprises calcining a mixture of magnesium carbonate, calcium carbonate, and a reagent containing magnesium chloride, at a temperature from 150° centigrade upward, and washing the calcined materials to dissolve out the calcium chloride.

8. A process of converting dolomite to a magnesium oxide of high grade, which comprises calcining a mixture of dolomite and a reagent containing magnesium chloride at a temperature from 150° centigrade upward, washing the calcined materials to dissolve out calcium chloride, and separating the insolubles from the formed calcium chloride by known methods.

9. A process of separating magnesium carbonate bearing and calcium carbonate bearing materials, which consists in adding a reagent containing magnesium chloride to a mixture of said calcium bearing and magnesium bearing materials, calcining at a temperature up to from 650° to 750° centigrade, and washing the calcined materials.

10. A process of producing a magnesium oxide of high grade which comprises adding a reagent containing magnesium chloride to a mixture of magnesium carbonate and calcium carbonate, and calcining the resultant mixture at a temperature up to from 650° to 750° centigrade.

11. A process of treating magnesium-calcium carbonates, which comprises adding a reagent containing a chloride of the non-alkaline metals to said carbonates, calcining the resultant mixture, and removing water-soluble products from the calcined material.

12. A process of producing a magnesium oxide of high grade, which consists in adding a reagent containing magnesium chloride to a mixture of magnesium carbonate and calcium carbonate, heating the resulting mixture until calcium chloride is formed, and removing water-soluble products from the calcined material.

13. A process of separating magnesium bearing and calcium bearing materials which consists in adding a reagent containing magnesium chloride to a mixture of magnesium carbonate and calcium carbonate, heating the resultant mixture until calcium chloride is formed, and washing the materials that have been subjected to heat to remove calcium chloride.

14. A process of separating magnesium carbonate bearing and calcium carbonate bearing materials which consists in adding a reagent containing magnesium chloride to a mixture of said calcium bearing and magnesium bearing materials, heating the resultant mixture until calcium chloride is formed, and washing the materials that have been subjected to heat to remove calcium chloride.

15. A process of separating magnesium bearing and calcium bearing materials, which consists in heating a mixture of magnesium carbonate, calcium carbonate, and a reagent containing magnesium chloride until calcium chloride is formed, and washing the materials that have been subjected to heat to dissolve out calcium chloride.

16. The process of converting dolomite to a magnesium oxide of high grade, which consists in heating a mixture of dolomite and a reagent containing magnesium chloride until calcium chloride is formed, washing the materials that have been subjected to heat to dissolve out calcium chloride, and separating the insolubles from the calcium chloride by known methods.

17. A process of producing magnesium oxide which comprises adding magnesium chloride to a mixture of magnesium carbonate and calcium carbonate, calcining the resultant mixture, and removing water-soluble products from the calcined material.

In testimony whereof I hereby affix my signature.

WILLIAM KOEHLER.